UNITED STATES PATENT OFFICE.

CHARLES W. DANFORTH, OF YOUNGSTOWN, OHIO, WILLIAM P. SAMUELS, OF NEW CASTLE, PENNSYLVANIA, AND WILLIAM T. MARTERSTECK, OF YOUNGSTOWN, OHIO.

METHOD OF TREATING COMPLEX CARNOTITE ORES.

1,126,182.  Specification of Letters Patent.  Patented Jan. 26, 1915.

No Drawing.  Application filed May 1, 1914.  Serial No. 835,735.

*To all whom it may concern:*

Be it known that we, CHARLES W. DANFORTH, a resident of Youngstown, county of Mahoning, and State of Ohio, WILLIAM P. SAMUELS, a resident of New Castle, county of Lawrence, and State of Pennsylvania, and WILLIAM T. MARTERSTECK, a resident of Youngstown, county of Mahoning, and State of Ohio, all citizens of the United States, have invented certain new and useful Improvements in Methods of Treating Complex Carnotite Ores, of which the following is a specification.

This invention has reference to a novel method of treating complex carnotite ores.

Carnotite ores contain essentially vanadium, uranium, and radium in form of hydrated vanadate of uranium and potash. These ores are not particularly refractory and generally are sands impregnated with yellow carnotite. Other carnotite ores represent largely a complex mixture of peculiar vanadium sands with some carnotite proper. These complex ores are very refractory and cannot be treated effectively and economically by the present methods such as are used with the first mentioned kind of less refractory ores.

It is the purpose of the present invention to treat the complex refractory carnotite ores by means of a novel method which is carried out in a simple and cheap manner for the purpose of obtaining especially vanadium compounds while uranium and radium may be recovered in such forms as desired.

Heretofore vanadium ores of the less refractory type have been treated by dissolving the ground ore and subjecting the solution to the action of an oxidizing agent. Further such ore has been treated by producing an acid solution, neutralizing said acid solution by contact with fresh ore, reducing the metallic compounds by sulfurous acid, precipitating sulfate free from valuable products and recovering the latter from the remaining solution. In both instances the vanadium ore was crushed and worked up in its ground but raw condition. These methods cannot be used to any advantage in treating the complex carnotite ores composed of vanadium sands with some carnotite proper on account of its refractory quality.

In working up the complex carnotite ores we substantially proceed as follows: The complex carnotite ore is crushed or ground and the reduced ore passed through a sieve of 40 mesh. The reduced ore is then subjected to a plain oxidizing roast at a temperature of about 1100° F. Generally one hour's roasting is sufficient to prepare the ore for further treatment. These complex ores cannot be separated by filtration when worked up in a raw condition but this is easily effected after the ores were subjected to preliminary oxidizing roast. For this reason the preliminary roasting is an essential feature for the utilization of the complex ores. The roasted ore is now treated with a strong solution of sulfuric acid or a warm solution of sulfuric acid may be used. This treatment fixes all the radium with the sands and the barium which may be present in the ore, in form of sulfates while the vanadium, about 90%, and all the uranium are contained in the solution. When the precipitates and insoluble matter have settled at the bottom the supernatent solution is separated therefrom by decantation or filtration. The vanadium and the uranium may be recovered from this solution by various methods according to the forms in which it is desired to market the final products.

Certain complex ores are preferably treated directly after the roasting, while still warm, with a solution of sulfuric acid of about 1.30 sp. gr., care being taken that the temperature during the extraction is about 80° C. The extraction is completed in about 40 min. depending on the temperature of the acid solution. Thus the heat from the roasted ore is used to furnish the required initial heat. This treatment with acid dissolves over 90% of the vanadium and all the uranium present. The solution may be separated from the residues by gravity, filtration, or by means of a suction filter. The vanadium and uranium are recovered from this solution in any desired marketable form.

If complex ores are to be worked up which, according to a preliminary test, contain a low percentage of uranium then the sulfuric acid solution will contain in the main, vanadium, uranium, lime, magnesia, alumina and iron. In this instance the acid solution may be neutralized far enough with an alkali so that the vanadium is completely precipitated while a considerable amount of the other metallic compounds remain in solution. As stated this may be done when vanadium alone is to be recovered from ores containing little uranium.

For the purpose of recovering the radium, the residues containing all the barium and radium are washed with water until they are free from soluble sulfates and sulfuric acid. These residues are then treated with a mixed solution of caustic soda and carbonate of soda. The strength and proportions of these two components of the caustic solution are regulated according to the amounts and proportions of silicates and sulfates of barium and radium. In many instances equal proportions containing about 20% of each component may be used to advantage. This alkaline solution transforms the barium and radium compounds so that the sulfates and silicates are rendered soluble in form of sodium salts while the barium and radium form carbonates which remain with the residues. The solution of the sodium salts is now separated from the residues, preferably by filtration and the residue washed thoroughly with water until free from soluble salts. The residues are now treated with a dilute solution of hydrochloric acid which easily dissolves all the carbonate of barium and radium. The radium bearing solution is then separated from the sands which are thoroughly washed with water. Now barium and radium sulfates are precipitated with sulfuric acid and these raw sulfates when separated and obtained in a clean condition are transformed into chlorids and the separation and concentration of the radium chlorid is easily accomplished by known methods. When the raw sulfates of barium and radium are precipitated with sulfuric acid sufficient barium salt must be present at this stage and if not present some barium salt must be introduced to secure the proper ratio between radium and barium salts to insure the complete precipitation of the radium sulfate. This may be introduced in the form of barium chlorid just previous to the precipitation of the raw sulfates. In this way between 60 and 90 per cent. of the radium present are obtained according to the character of the ore.

The above described process of treating complex carnotite ores results in a high efficiency at a corresponding cost. As hereinbefore stated 90 per cent. of vanadium and over may be recovered thereby.

We claim as our invention:

1. The process of treating complex carnotite ores consisting in subjecting the finely reduced ore to a plain oxidizing roast to transform the highly refractory complex carnotite ore to a condition in which it may be worked up, and recovering the valuable products from the roasted ore.

2. The process of treating complex carnotite ores consisting in subjecting the finely reduced ore to a plain oxidizing roast transforming thereby the highly refractory ore into a condition in which it may be worked up, and recovering the vanadium, uranium, and radium from the ores so treated.

3. The process of treating complex refractory carnotite ores consisting in subjecting the finely reduced ore to a plain oxidizing roast, adding sulfuric acid to separate radium and sands and dissolve the vanadium and uranium, separating the residue from the solution by filtration, and recovering the vanadium and uranium from the solution.

4. The process of treating complex refractory carnotite ores consisting in subjecting the finely reduced ore to a plain oxidizing roast, adding sulfuric acid to the still hot ore to fix the radium and sands as a residue and dissolve the vanadium and uranium, separating the residue from the solution by filtration, and recovering the vanadium and uranium from the solution and the radium from the residue.

5. The process of treating complex refractory carnotite ores consisting in subjecting the finely reduced ores to a plain oxidizing roast, adding a strong solution of warm sulfuric acid to fix all the radium and barium present in the ore in form of insoluble sulfates with the residual sands and dissolve nearly all the vanadium and all the uranium, separating the solution from the residue by filtration, and recovering the vanadium and uranium from the solution and the radium from the residue.

Signed at Youngstown, Ohio, this 27" day of April, 1914.

CHARLES W. DANFORTH.
WILLIAM P. SAMUELS.
WILLIAM T. MARTERSTECK.

In presence of—
A. D. THOMAS,
A. B. ENNIS.